United States Patent Office 3,125,528
Patented Mar. 17, 1964

3,125,528
METHOD OF LUBRICATING AUTOMOTIVE VEHICLES
Edward L. Kay, Akron, Ohio, and Raymond B. Tierney, Wappingers Falls, Robert H. Krug, Cornwall, and Clemence J. Henry, Newburgh, N.Y., assignors to Texaco Inc., New York, N.Y., a corporation of Delaware
No Drawing. Filed Sept. 29, 1960, Ser. No. 59,179
7 Claims. (Cl. 252—49.6)

This invention relates to the lubrication of automotive vehicles and, more particularly, to the lubrication of unified automatic transmission and differential units by means of lubricating oils containing organic boron compounds.

Automobile manufactures have been actively engaged during the fast few years in the development of a unified transmission-differential assembly, wherein hypoid drive gears are mounted on an axle of a special type between the engine and transmission. This assembly, known as the "transaxle" unit, is described, for example, in Automotive Industries, pages 33–37, 70–71 (October 1, 1959). A special feature of this design is the simplified lubrication system wherein both the rear axle differential gears and a manual shift transmission are lubricated from a common lubricant supply. However, the development of an automatic transmission transaxle unit including this simplified lubrication system has been delayed by the unavailability of a lubricant having the properties required for lubrication of both the differential gears and the automatic transmission comprising a fluid torque converter.

A lubricant having superior extreme pressure properties of the type required to prevent scuffing and pitting of hypoid gear teeth is required for transaxle differential lubrication, since wear of this type is greatly increased by the larger amount of gear tooth sliding of the high offset transaxle gears operating under high pressures and at high velocities. It has not been possible heretofore to obtain extreme pressure properties of this character in a lubricant having the required properties for hydraulic transmission lubrication also, primarily because the experience in the art has been that high extreme pressure properties are generally incompatible with the high stability, chemical intertness and other properties required in a hydraulic transmission fluid. The conventional gear oil extreme pressure additives, containing active sulfur, phosphorus or chlorine, are wholly unsuitable for this purpose, because of their heat and oxidation instability and chemical reactivity, resulting in loss of transmission cleanliness by formation of sludges, chemical attack upon clutch plate facings and other difficulties. More stable extreme pressure additive of various types having good extreme pressure properties under other lubricating conditions are generally of insufficient extreme pressure effectiveness in the lubrication of transaxle hypoid gears. In addition, the problem of imparting the extreme pressure properties required for transaxle hypoid gear lubrication to automatic transmission fluids is complicated by various other difficulties, such as the effects of many extreme pressure or anti-wear additives in causing rubber swelling, increased foaming and air retention, and alterations of the critical viscosity and lubricity characteristics of the transmission fluid resulting in difficulties such as squawking and slipping of the clutch plates.

We have now found that the lubricating properties required for lubricating transaxle units containing hydraulic transmissions are obtained in lubricating compositions containing minor amounts of certain organic boron compounds. By means of these compounds, the extreme pressure properties required for satisfactory lubrication of transaxle differential gears are imparted to lubricating oils, including those of relatively low viscosity such as those employed as automatic transmission fluids, without impairing to any objectionable degree any of the properties required for automatic transmission lubrication. In addition, these compounds are generally compatible with detergents, anti-oxidants, viscosity index improvers and various other additives commonly employed in transmission lubricants.

The effectiveness of the organic boron compounds for imparting the extreme pressure properties required for differential rear axle gear lubrication was entirely unexpected and unpredictable, since these compounds are chemically unlike other extreme pressure additives which are effective under the conditions of hypoid gear lubrication, and previous experience under different extreme pressure conditions has indicated that they have little or no extreme pressure effectiveness. While we do not wish to be limited by any particular theory, the evidence indicates that the organic boron compounds function as load carrying and anti-wear additives under the conditions of rear axle hypoid gear lubrication by the formation of metal boride and/or boron carbide on the gear surfaces. That is, under the very high localized temperatures existing on the surface of mating gears functioning under high loads and high speeds, the boron compound thermally decomposes and the boron reacts with the gear surface. The resulting surfaces are harder and have greatly increased resistance to deterioration of the types caused by the conditions to which they are subjected in the gear operation, involving chiefly scuffing and pitting.

The organic boron compounds which are employed in accordance with this invention are stable, oil-soluble compounds containing a >BR or >BOR group, wherein R is a hydrocarbon or substituted hydrocarbon group. Suitable compounds of this class are those which do not decompose in the presence of oxygen at ordinary and moderately elevated temperatures and are substantially non-corrosive to metals, including copper, at ordinary and moderately increased temperatures, as for example under the conditions of the MIL–L–002105A copper strip corrosion test, carried for three hours at 250° F. The preferred compounds of this class are borate, diborate and boronate esters represented by the formulas:

$$R_nB(OR')_m \text{ and } R_{n'}(BOB)(OR')_{m'}$$

wherein R is a hydrocarbon group and R' is a hydrocarbon group or hydrogen, $n$ is a whole number from 0 to 2, inclusive, $m$ is a whole number from 1 to 3 inclusive, the sum of $n$ and $m$ being 3, $n'$ is a whole number from 0 to 3, inclusive, $m'$ is a whole number from 1 to 4, inclusive, and the sum of $n'$ and $m'$ is 4, the compound containing at least one hydrocarbon group represented by R or R'. Particularly preferred compounds are those wherein all of the groups represented by R' are hydrocarbon groups. Hydrocarbon groups represented by R and R' may be alkyl, aryl, alkaryl or aralkyl groups, or such groups containing substituents of various types which do not substantially increase the chemical reactivity or corrosiveness of the compound.

Examples of suitable compounds of the above class include trimethyl borate, tri-n-propyl borate, tri-isobutyl borate, tristearyl borate, triphenyl borate, tri-(nonylphenyl) borate, di-(2-ethylhexyl) nonylphenyl borate, tri-(p-tertiary-butylphenyl) borate, tricresyl borates, tribenzyl borate, tri-2-phenylcyclohexyl borate, tri-(di-isobutyl-carbinyl) borate, tri-(tetrahydrofurfuryl) borate, tri-(2,6,8-trimethyl-4-nonyl) borate, tri-cyclohexyl borate, tri-(7-ethyl-2-methyl-4-undecyl) borate, tetrabenzyl diborate, tetra-(nonylphenyl) diborate, n-hexyl boronic acid, n-octyl boronic acid and di-(2-ethylhexyl)2-ethylhexyl boronate. Particularly preferred compounds are the tri-n-propyl borate, tribenzyl borate and the tricresyl borates.

The lubricating compositions which are employed in accordance with this invention comprise essentially a lubricating oil of relatively low viscosity containing about 0.1–10 percent by weight of organic boron compound of the character described above, and preferably about 0.5–5.0 percent by weight of such compound. In addition, these compositions may contain various other additives such as are conventionally employed in transmission oils, such as detergents, anti-oxidants, viscosity improvers, corrosion inhibitors, and other extreme pressure additives of various types which do not deleteriously affect the stability or other desired properties of the composition.

Detergents which may be employed in these compositions comprise in general metal salts of acidic organic compounds having high solubility in lubricating oils, particularly those wherein the metal component is a member of the group consisting of alkali metals, alkaline earth metals and zinc. Suitable acidic materials for producing these compounds include particularly sulfonic acids having molecular weights in about the range 350–450, alkyl phenols containing at least one alkyl group containing at least 4 carbon atoms, and preferably at least 8 carbon atoms, sulfides of such alkyl phenols wherein two phenol nuclei are connected by one or more sulfur atoms, and olefin polymer-phosphorus sulfide reaction products wherein the olefin polymer has a molecular weight of about 500–1500. Very advantageously, the lubricant composition may contain at least one detergent compound of this class in an amount of about 0.1–10 percent by weight of the composition.

Suitable oxidation inhibitors for use in these compositions include particularly alkyl phenols, such as 2,6-ditertiary butyl-4-methyl phenol, aryl amines, amino phenols, etc. Such compounds may be employed in amounts up to about 5 percent by weight, and most advantageously in amounts of about 0.2–2 percent by weight based on the weight of the composition.

Viscosity index improvers which may be employed in the compositions are generally polymeric materials of various types, including olefin, diolefin, mixed olefin-diolefin, olefin-styrene, etc., polymers and ester type polymers such as acrylates, methacrylates, maleic or fumaric ester-vinyl acetate copolymers, etc., wax alkylated naphthalene, etc. Particularly suitable materials of this type are the methacrylate polymers, having molecular weights in the range from about 5000 to about 75,000, which are sold commercially under the trade name "Acryloid." The preferred polymeric materials are those having molecular weights of about 10,000–20,000. The lubricating composition may very advantageously contain about 0.5–5.0 percent by weight of such viscosity index improved, preferably in an amount sufficient to obtain a composition having a viscosity index of at least about 125.

The lubricating oils employed are preferably oils having viscosities in about the range from 30 to 60 Saybolt Universal seconds at 210° F., and preferably in the range from about 40 to about 50 seconds at 210° F. Most advantageously, the mineral oils employed are blended refined oils of predominantly paraffinic character. Synthetic oils, which may be employed either as the total oil component or in blends with mineral lubricating oils, include particularly dicarboxylic acid esters such as di-2-ethylhexyl sebacate, di(secondary amyl) sebacate, di-2-ethylhexyl azelate, etc., and condensation products of dicarboxylic acids with glycols as disclosed in U.S. Patent 2,628,974.

The effectiveness of the organic boron compounds as extreme pressure agents in gear lubricants functioning under severe wear conditions is demonstrated by gear test results given in Tables I and II, below.

TABLE I

| Oil composition: | Ryder gear test, tooth load, p.p.i. |
|---|---|
| Mineral oil (A) | 1460 |
| Mineral oil (A) +0.5% tri-n-propyl borate | 4590 |
| Mineral oil (B) | 2660 |
| Mineral oil (B) +0.5% tri-n-propyl borate | 6000+ |
| Synthetic ester oil | 2375 |
| Synthetic ester oil +0.5% tri-n-butyl borate | 4250 |
| Synthetic ester oil+0.5% 1-ethynylcyclohexyl borate | 3770 |
| Synthetic ester oil+0.5% n-octyl boronic acid | 4300 |
| Synthetic ester+1.0% phenothiazine | 1670 |
| Synthetic ester+1.0% phenothiazine+1.0% tri-n-propyl borate | 4400+ |
| Synthetic ester+1.0% phenothiazine+1.0% tricresyl phosphate | 1450 |
| Mineral oil (C) | 1600 |
| Mineral oil (C) +1.0% tricresyl phosphate | 1675 |

The Ryder gear test is a test for the evaluation of the anti-scuffing and load-carrying ability of lubricants under the conditions of gear lubrication, wherein the lubricant is employed to lubricate two spur gears in a Pratt and Whitney gear and lubricant tester (also called the Ryder gear tester). In the tester employed, the face width of the driven gear was 0.937 inch and the face width of the driving gear was 0.25 inch. The tester was operated with a gear speed of 10,000 r.p.m. and with an oil inlet temperature of 165±5° F., a loading pressure of 5.0 p.s.i. being applied during break-in. After ten minutes, the tester was shut down and the gear examined for the percentage of tooth area scuff on each tooth. The procedure was then repeated using higher load pressures with increments of 5 p.s.i. until 22.5 percent of the total tooth face area on the driving gear had been scuffed, the load applied in this run being considered the scuff load. A tooth load conversion factor of 18.5 square inches was multiplied by the loading pressure at the scuff load and divided by the width of the driving gear (0.25 inch) to obtain the tooth load in pounds per inch of tooth width.

Mineral oil (A) of the table was a refined paraffinic distillate oil having a Saybolt Universal viscosity of 47 seconds at 210° F. Mineral oil (B) was a blend of a refined paraffinic oil, residual oil and a refined paraffinic distillate, the blend having a Saybolt Universal viscosity at 210° F. of about 100 seconds. Mineral oil (C) was a refined naphthenic oil having a Saybolt Universal viscosity at 100° F. of about 500 seconds. The synthetic ester oil was di-2-ethylhexyl sebacate.

Table II shows results obtained with lubricating oils containing boron compounds in the IAE gear test, described in British specification D.E.R.D. 2487. This test differs principally from the Ryder gear test in that it is carried out in gears having non-indexed type motion. The results obtained in the IAE gear test correlate closely with the performance of lubricants in the transaxle differential, an IAE gear test load of at least 40 pounds, and usually of at least 60 pounds, being required to indicate satisfactory performance by a mineral lubricating oil composition in transaxle differential lubrication.

TABLE II

| Additive: | IAE gear test (6000 r.p.m.), tooth load, lbs. |
|---|---|
| None | 18 |
| 2.0% trimethyl borate | 43 |
| 1.0% tri-n-propyl borate | 63 |
| 2.0% tri-n-propyl borate | 70 |
| 2.0% tribenzyl borate | 60 |
| 0.5% tri-(nonylphenyl) borate | 93 |
| 0.5% tetra(nonylphenyl) diborate | 80 |
| 2.0% diborate of bis(o-hydroxyalkyl-phenylmethyl) amine | 83 |
| 1.5% di-n-hexyl-nonylphenyl borate | 75 |
| 1.0% tricresyl phosphate | 20 |

The lubricating oil employed in the above compositions was a refined paraffinic distillate oil blend having a Saybolt Universal viscosity at 210° F. of 42 seconds.

As shown by the results given in the above tables, the boron compounds greatly increased the gear lubricating properties of both mineral oils of different types and a synthetic ester oil under severe scuffing conditions being markedly different in this respect from tricresyl phosphate, which is commonly employed as a load bearing and anti-wear additive under different conditions, not involving the scuffing action which is the principal cause of failure in hypoid gear lubrication.

In contrast to their effectiveness in imparting anti-wear properties to lubricating oils of the type required to prevent scuffing and pitting of a metal surface under the conditions of gear operation, the boron compounds have little or no effectiveness in increasing load bearing and anti-wear properties of mineral lubricating oils under different extreme pressure or load bearing conditions, and only mild extreme pressure properties under certain conditions in synthetic ester oils. The following tables show typical results obtained in conventional extreme pressure and wear tests with mineral lubricating oils containing borate esters.

TABLE III

| Composition | Mineral Oil | Mineral Oil +0.5% tri-n-propyl borate |
|---|---|---|
| Almen Test, lbs | 7 | 8 |
| SAE/SOD, E.P. Ave. load, lbs | 950 | 233 |
| Timken, O.K., lbs | Score at 10 | 10 |
| Navy Four Ball Wear Test Microns/minute | 7 | 9 |

TABLE IV

| Composition | Mineral Oil | Mineral Oil +3% tri-o-cresyl borate |
|---|---|---|
| Mean Hertz Load, Kg | 18 | 20 |
| SAE Machine Test (500 r.p.m.) lbs | 140 | 137 |

A number of different lubricating compositions representative of the lubricating compositions which are employed in accordance with this invention were prepared by adding various borate esters in amounts from about 0.5 to about 5.0 percent by weight of the composition to mineral lubricating oils having viscosities in the range from about 40 to about 50 Saybolt Universal seconds at 210° F., comprising at least a major portion of refined paraffinic oils, and containing additives of various types ordinarily employed in hydraulic transmission oils, such as detergents, anti-oxidants and polymeric viscosity improvers.

Lubricating compositions were obtained in the above manner which very successfully passed all of the requirements adopted by the automotive industry for a transaxle lubricant suitable for the lubrication of both an automatic transmission and the differential gears of a transaxle unit. These requirements include satisfactory performance in the GMR hypoid gear test for transaxle fluid, No. 2 (Oldsmobile double-bump test) described, for example, in the SAE Journal, vol. 68, No. 2, pages 68–9 (February 1960), in addition to the requirements for a hydraulic transmission fluid. The following table shows transmission performance tests on a representative composition of this type, comprising a predominantly paraffinic low viscosity mineral lubricating oil containing a commercial detergent additive and a polymeric viscosity index improver, the composition having a viscosity at 210° F. of about 52.4 seconds.

TABLE V

*Transmission Performance Tests*

| Oldsmobile Cycling Test (6,000 cycles) | Base Oil | Base Oil+ 1% tri-n-propyl borate |
|---|---|---|
| Clutch plate condition: | | |
| Front, rear [a] | 8.8 | 9.9 |
| Average Varnish [b] | 100 | 99 |
| Average Sludge [b] | 98 | 94 |
| Powerglide Oxidation Test: | | |
| Average Varnish [b] | 95 | 98 |
| Average Sludge [b] | 90 | 93 |
| Average Thrust Washer, wt. loss, percent | 0.014 | none |

([a]) Based on 10 as perfect.
([b]) Based on 100 as perfect.

Other lubricating compositions obtained by employing various borate esters in hydraulic transmission oils, both of the detergent and non-detergent types have been found to give very satisfactory performance in both the gear and transmission lubrication tests and also in actual road tests wherein a single lubricant was employed to lubricate both an automatic transmission and the differential gears of a transaxle unit.

In contrast to the above results, conventional gear lubricant additives which were added to these compositions badly degraded their transmission lubrication properties in one or more respects. For example, a lubricating composition having the extreme pressure properties required for rear axle lubrication obtained by adding 12 percent by weight of an active chlorine and sulfur containing commercial extreme pressure additive to a detergent type transmission oil, completed only 321 cycles in the Oldsmobile cycling test. At the end of this time the clutch plates were worn to the bare metal and badly warped, corrosion was widespread and sludge was extremely heavy. The addition of 2.5 percent by weight of an active phosphorus and sulfur containing commercial extreme pressure additive degraded the clutch plate rating from 8.8 to 3.4 and the sludge rating from 97 to 56 in the Oldsmobile cycling test. When chlorinated paraffins or phosphonates were added to these lubricants, a heavy gelatinous sludge was found to be dispersed throughout the entire transmission in the Powerglide oxidation test. Other extreme pressure additives of various types which were tested for this purpose were either insufficiently effective for imparting the required gear lubricating properties or they also degraded the transmission lubricating properties of the composition in one or more respects.

Obviously many modifications and variations of the invention as hereinbefore set forth may be made without departing from the spirit and scope thereof and only such limitations should be imposed as are indicated in the appended claims.

We claim:
1. In the lubrication of the power train of an automotive vehicle having a transaxle unit comprising rear axle hypoid gears and a hydraulic transmission, the improvement which comprises supplying to both the rear axle gears and to the transmission a lubricating composition consisting essentially of a major amount of a lubricating oil, selected from the group consisting of mineral lubri- cating oil and a synthetic carboxylic acid ester lubricating oil, and from about 0.1 to 10 percent by weight of an organic boron compound of the class represented by the formulas:

$$R_nB(OR')_m$$

and $$R_{n'}(BOB)(OR')_{m'}$$

wherein R is a hydrocarbon group having from 1 to 18 carbon atoms, R' is selected from the class consisting of hydrogen and a hydro-carbon group having from 1 to 18 carbon atoms, $n$ is a whole number from 0 to 2, inclusive, $m$ is a whole number from 1 to 3 inclusive, the sum of $n$ and $m$ being 3, $n'$ is a whole number from 0 to 3 inclusive, $m'$ is a whole number from 1 to 4 inclusive, the sum of $n'$ and $m'$ being 4, at least one of said groups represented by R and R' being a hydrocarbon group, said lubricating composition having a viscosity in the range from about 45 to about 60 seconds Saybolt Universal at 210° F.

2. The method according to claim 1 wherein the said boron compound is present in an amount of 0.5–5.0 percent by weight.

3. The method according to claim 1 wherein the said boron compound is tri-n-propyl borate.

4. The method according to claim 1 wherein the said boron compound is tribenzyl borate.

5. The method according to claim 1 wherein the said boron compound is tricresyl borate.

6. The method according to claim 1 wherein the said lubricating oil is a predominantly paraffinic mineral oil having a viscosity in the range from about 30 to 60 seconds Saybolt Universal at 210° F.

7. The method according to claim 1 wherein the said lubricating oil is a synthetic carboxylic acid ester oil having a viscosity in the range from about 30 to about 60 seconds Saybolt Universal at 210° F.

References Cited in the file of this patent

UNITED STATES PATENTS

| | | |
|---|---|---|
| 2,053,474 | Graves et al. | Sept. 8, 1936 |
| 2,154,098 | Loane et al. | Apr. 11, 1939 |
| 2,160,917 | Shoemaker et al. | June 6, 1939 |
| 2,333,871 | Lincoln et al. | Nov. 9, 1943 |
| 2,710,842 | Heisig et al. | June 14, 1955 |
| 2,866,811 | Irish et al. | Dec. 30, 1958 |
| 2,961,408 | Havely et al. | Nov. 22, 1960 |

FOREIGN PATENTS

| | | |
|---|---|---|
| 578,779 | Canada | June 30, 1959 |

UNITED STATES PATENT OFFICE
CERTIFICATE OF CORRECTION

Patent No. 3,125,528                            March 17, 1964

Edward L. Kay et al.

It is hereby certified that error appears in the above numbered patent requiring correction and that the said Letters Patent should read as corrected below.

Column 6, TABLE V, second column, line 1 thereof, for "8.8" read -- 8,8 --; same table, same column, line 6 thereof, for "0.014" read -- 0.017 --; same table, third column, line 1 thereof, for "9.9" read -- 9,9 --; same column 6, line 52, for "8.8 to 3.4" read -- 8,8 to 3,4 --.

Signed and sealed this 28th day of July 1964.

(SEAL)

Attest:

ESTON G. JOHNSON
Attesting Officer

EDWARD J. BRENNER
Commissioner of Patents